C. B. LAMB.
NUT LOCK.
APPLICATION FILED FEB. 11, 1910.
981,284.
Patented Jan. 10, 1911.
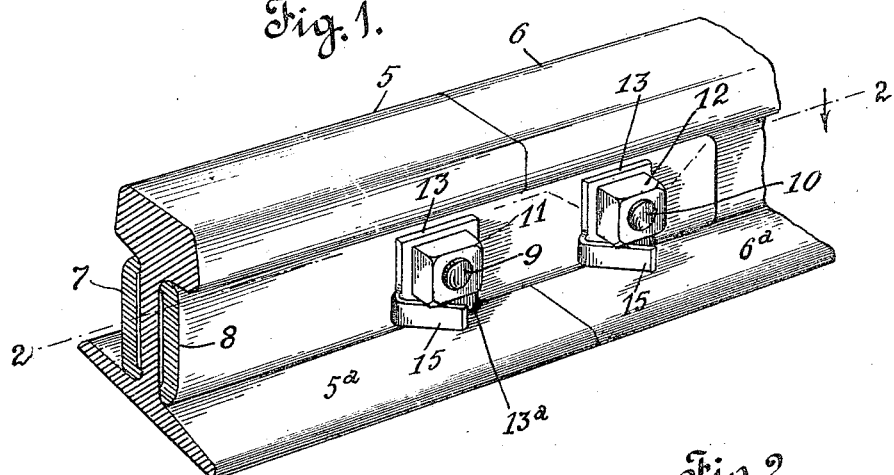
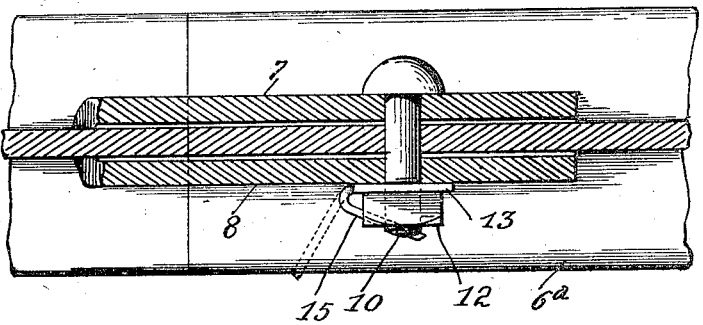
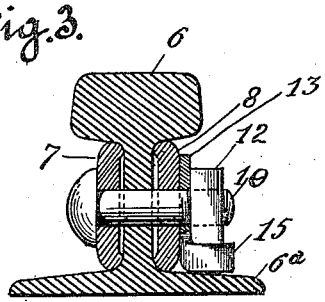
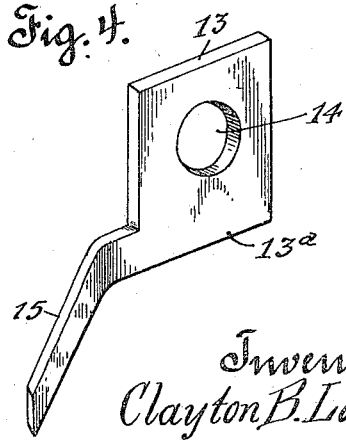
Witnesses,
Inventor,
Clayton B. Lamb
By
Attorn

UNITED STATES PATENT OFFICE.

CLAYTON B. LAMB, OF LOS ANGELES, CALIFORNIA.

NUT-LOCK.

981,284.

Specification of Letters Patent.

Patented Jan. 10, 1911.

Application filed February 11, 1910. Serial No. 543,212.

*To all whom it may concern:*

Be it known that I, CLAYTON B. LAMB, a citizen of the United States, residing in the city of Los Angeles, county of Los Angeles, State of California, have invented new and useful Improvements in Nut-Locks, of which the following is a specification.

My invention relates to that class of nut locks in which a portion of the washer provides the lock to prevent the nut turning and the object thereof is to produce an efficient and simple device which will prevent the nut from turning on the bolt when the lock is in place, and which can be readily locked and unlocked without the use of special tools for that purpose.

In the drawings accompanying this application and forming a part thereof, I have shown my device applied to locking nuts on a railway rail, and shall describe it herein as applied to that purpose.

Figure 1 is a perspective view of a railway rail joint with my improved locking device in position to secure the nuts from turning upon their bolts. Fig. 2 is a horizontal section of a portion of the parts shown in Fig. 1 taken on the line 2—2 of Fig. 1. Fig. 3 is a vertical section of a portion of a rail joint, the rail, fish plate and a part of the washer being in section and the washer tongue and bolt and nut being in elevation. Fig. 4 is a perspective of my improved locking device.

In the drawings, 5 and 6 are the abutting ends of two railway rails which are secured together by means of the fish plates 7 and 8, bolts 9 and 10, and the nuts 11 and 12.

My improved nut lock consists of the plate 13 having an aperture 14 therethrough which is easily passed over the bolt upon which it is used and tongue 15. Some portion of the plate is shaped to engage a fixed part and thereby be prevented from turning on the bolt. In the drawings I have shown the lower portion 13ª of the body engaging the base flanges 5ª and 6ª of the rails. Integral with the body and projecting therefrom is a locking tongue 15 which is of a width to snugly fit when positioned for use between the edge of the nut and the fixed part, and thereby interpose a non-compressible part between the two, which will absolutely prevent the nut from turning on the bolt. The plate and tongue are preferably formed of soft steel or other metal of sufficient elasticity to permit the tongue to be bent repeatedly without breaking.

When my improved nut lock is constructed for use on railway rails I prefer to have the tongue project from the lower left hand corner, and to be bent at a short distance from the main body of the plate so that when placed on the bolt the outer end of the tongue will be at a distance from the fish plate when the end of the tongue can be readily struck with the wrench and bent to lie between the corner of the nut and the base flange of the rail. The point at which the tongue is bent should be clear of contact with, and not passed over by the nut, as it is rotated on the bolt, so that when it is desired to take the nut off the bolt, the tongue need not be bent back of a vertical position, thereby prolonging its life and usefulness. I have found in practice extending over many months, that such a construction when the tongue is bent as shown in the drawings, forms a safe and efficient lock. By bending the tongue as shown in Fig. 4 of the drawing, when the lock is prepared for use, it prevents the user from accidentally putting on the lock in the wrong position, as the end of the tongue must project away from the rail when it is properly positioned, and be adjacent to the base thereof.

To lock the nut by the use of my improved nut lock, the same is used as a washer between the nut and fish plate with the tongue as shown in dotted lines in Fig. 2. The nut is screwed upon the bolt until the lower side thereof is parallel with the base of the rail when finally adjusted. With the wrench the tongue is then bent so that it passes below the advancing corner of the nut and the base of the rail when turning to unscrew the nut, thereby presenting a noncompressible material between the nut and the base of the rail, thus absolutely preventing the nut from turning on the bolt. It will be understood that in this construction the bolt is provided with a right hand thread. By interposing a tongue between the edge of the nut and the base of the rail, lighter material can be used in the construction of the nut lock than could be used if the tongue was relied upon entirely to prevent the rotation of the nut on the bolt, because the base of the rail forms a support for the tongue and prevents it from giving away when made of light material. When it is desired to remove the nut the tongue can be bent outwardly a sufficient distance to permit the nut to clear it without injury thereto, thus permitting its use many times if desired.

What I claim is:

1. A nut lock consisting of a plate having an aperture therethrough, said aperture constituting a bolt hole, said plate having some portion of the body thereof of the shape to engage a fixed part, and thereby be prevented from turning on the bolt, and a tongue projecting from the body of the plate and being of a width to snugly fit between the nut and the fixed part when an edge of the nut is brought parallel to the fixed part, and the tongue is bent to lie between the nut and the fixed part, said tongue commencing at a point of the body not engaged or passed over by the nut when being screwed into place.

2. A railway nut lock comprising in combination, railway rails, fish plates, bolts and nuts, with an elastic metallic washer having an aperture therethrough threaded upon the bolt between the nut and the fish plate, and having the lower edge of the body thereof engaging the base of the rail and having a tongue projecting from the lower left hand corner, said tongue being of a width to snugly lie between the base of the rail and the lower edge of the nut when in place and parallel to the base of the rail when such tongue is bent to the proper position.

3. A nut lock washer consisting of a plate provided with a bolt hole and a bearing edge; a tongue extension integral with the body of the plate and of a width to fit snugly between a side of the nut and the base of the rail when the nut is positioned for use with the side thereof parallel to the base of the rail and the end of the tongue is bent to lie beneath the nut, one edge of said tongue being an extension of the bearing edge, the outer end of the tongue being angularly bent to the plane of the body before being positioned for use.

In witness that I claim the foregoing I have hereunto subscribed my name this 5th day of February, 1910.

CLAYTON B. LAMB.

Witnesses:
G. E. Harpham,
S. B. Austin.